US006801856B2

(12) United States Patent
Ohba et al.

(10) Patent No.: US 6,801,856 B2
(45) Date of Patent: Oct. 5, 2004

(54) ATMOSPHERE CONDITION PREDICTION METHOD

(75) Inventors: Ryohji Ohba, Nagasaki (JP); Tomohiro Hara, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/433,123

(22) PCT Filed: May 27, 2002

(86) PCT No.: PCT/JP02/05096
§ 371 (c)(1),
(2), (4) Date: May 29, 2003

(87) PCT Pub. No.: WO03/036333
PCT Pub. Date: May 1, 2003

(65) Prior Publication Data
US 2004/0054476 A1 Mar. 18, 2004

(30) Foreign Application Priority Data
Oct. 19, 2001 (JP) .................................... 2001-321455

(51) Int. Cl.[7] .................... G06F 15/177; G06F 17/13; G06F 159/00
(52) U.S. Cl. ............................................ 702/3
(58) Field of Search ................ 702/3, 4, 5; 324/26; 706/931; 703/2, 5, 6

(56) References Cited

U.S. PATENT DOCUMENTS

| 5,406,481 A | 4/1995 | Shinozawa et al. | |
| 6,173,276 B1 * | 1/2001 | Kant et al. | 706/50 |

FOREIGN PATENT DOCUMENTS

| GB | 2343533 A | 5/2000 |
| JP | 5-61842 A | 3/1993 |
| JP | 7-20255 A | 1/1995 |
| JP | 7-63861 A | 3/1995 |
| JP | 7-128456 A | 5/1995 |
| JP | 11-353303 A | 12/1999 |
| JP | 2000-57127 A | 2/2000 |
| JP | 2002-156467 A | 5/2002 |

OTHER PUBLICATIONS

Evans, R.J. et al., 9th Joint Conf on Air Poll Met, pp. 193–197, (1996).
Lyons, W.A. et al., (9th Joint Conf on Air Poll Met, pp. 189–192, (1996).
Nachamkin, J.E. et al., Monthly Weather Review, vol. 128, No. 5, pp. 1225–1244, (2000).
McQueen, J.T. et al., Journal of Applied Meteorology, vol. 34, No. 10, pp. 2166–2181, (1995).

* cited by examiner

*Primary Examiner*—Donald McElheny, Jr.
(74) *Attorney, Agent, or Firm*—Birch, Stewart, Kolasch & Birch, LLP

(57) ABSTRACT

To determine a gas status (wind direction, wind speed), which is detailed in terms of space and time, from meteorological observation data, such as meteorological GPV, which are rough in terms of space and time, initial conditions and boundary conditions set based on the meteorological observation data are incorporated into differential equations for analysis of atmospheric phenomena, and computations are performed by a parallel computer 11. For the computations, a computation period is divided, for example, into four parts. Computations for the respective divisional computation periods are allocated to four processing units CPU's #1~#4 and performed simultaneously and parallelly. The results of the computations by the processing units CPU's #1~#4 are combined, whereby the gas status (wind direction, wind speed) detailed in terms of space and time during the entire computation period can be determined. In this case, the period is divided and parallel computations are performed, so that the computation period is shortened according to divisions.

5 Claims, 14 Drawing Sheets

Fig. 4

| R1 | | R2 | | R3 | |
|---|---|---|---|---|---|
| R1-1 | R1-2 | R2-1 | R2-2 | R3-1 | R3-2 |
| R1-3 | R1-4 | R2-3 | R2-4 | R3-3 | R3-4 |

1~#4
First Divisional
Computation Period
(t=0~3 Hours Later)

| R1 | | R2 | | R3 | |
|---|---|---|---|---|---|
| R1-1 | R1-2 | R2-1 | R2-2 | R3-1 | R3-2 |
| R1-3 | R1-4 | R2-3 | R2-4 | R3-3 | R3-4 |

5~#8
Second Divisional
Computation Period
(t=3~6 Hours Later)

| R1 | | R2 | | R3 | |
|---|---|---|---|---|---|
| R1-1 | R1-2 | R2-1 | R2-2 | R3-1 | R3-2 |
| R1-3 | R1-4 | R2-3 | R2-4 | R3-3 | R3-4 |

9~#12
Third Divisional
Computation Period
(t=6~9 Hours Later)

| R1 | | R2 | | R3 | |
|---|---|---|---|---|---|
| R1-1 | R1-2 | R2-1 | R2-2 | R3-1 | R3-2 |
| R1-3 | R1-4 | R2-3 | R2-4 | R3-3 | R3-4 |

13~#16
Fourth Divisional
Computation Period
(t=9~12 Hours Later)

Fig. 11
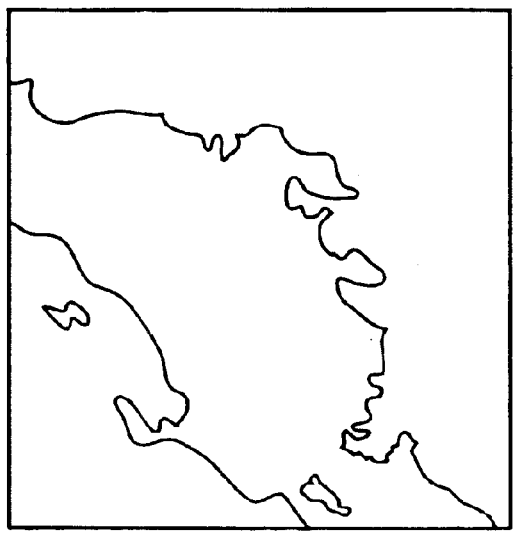
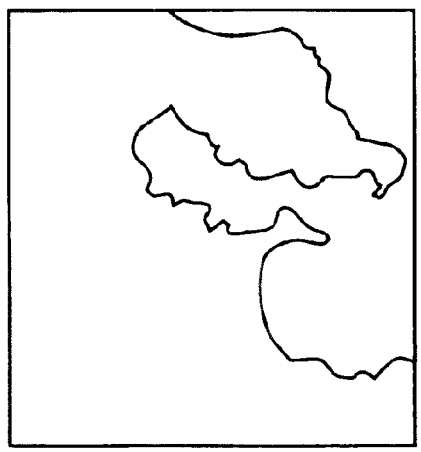
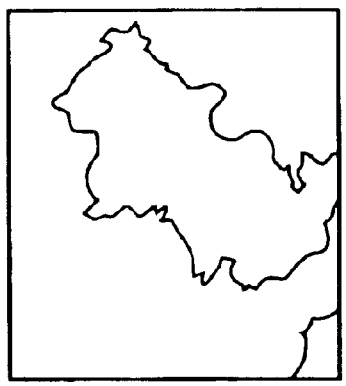

ATMOSPHERE CONDITION PREDICTION METHOD

This application is the national phase under 35 U.S.C. § 371 of PCT International Application No. PCT/JP02/05096 which has an International filing date of May 27, 2002, which designated the United States of America.

TECHNICAL FIELD

This invention relates to a gas status forecast method, one designed to be capable of determining a gas status (wind direction, wind speed, etc.), which is detailed in terms of space and time, accurately in a short time based on meteorological observation data which are rough in terms of space and time. By utilizing the gas status (wind speed site data) determined by the present invention, the diffusion status (diffusion range, diffusion concentration) of a diffused substance released from a diffusion source can be forecast by computation.

BACKGROUND ART

A diffusion status forecast system is under development which, if a radioactive substance is released to the outside by accident from facilities dealing with nuclear substances, forecasts the diffusion range of the radioactive substance and the concentrations of the radioactive substance at different locations, and predicts areas which may be endangered by the radioactive substance.

In this diffusion status forecast system, a gas status is forecast by computation, and then a diffusion status is forecast based on the gas status.

In more detail, the diffusion status of the radioactive substance is investigated as follows: First, partial differential equations, which analyze atmospheric phenomena, are solved based on meteorological observation data such as meteorological GPV (Grid Point Value) data and data from AMEDAS, etc. The solutions give wind directions and wind speeds at many evaluation locations (grip point positions) at constant time intervals (e.g., 10-minute intervals) during the period of time from the instant of occurrence of an event (e.g., release of a nuclear substance to the outside) until a point in time which is a predetermined time after the occurrence of the event. That is, a gas status representing wind speed site data at constant time intervals is determined.

Then, the concentration and properties of the diffused substance released, and the above wind speed site data are substituted into a diffusion equation for computing the diffused state of the substance, thereby computing the concentrations of the diffused substance at the respective grid point positions at the respective time intervals.

In this manner, the diffusion range of the radioactive substance released, and the concentrations of the radioactive substance at the different locations can be forecast.

The meteorological observation data, for example, meteorological GPV data, are delivered online from th Meteorological Business Support Center very 12 hours. The meteorological GPV data show meteorological data (wind velocity vectors (wind direction, wind speed), atmospheric pressure, temperature, moisture content) at a plurality of elevations (the elevations at 20 points from the earth's surface up to 10 Km high in the sky) at locations (called "parent grid point positions") where a plurality of latitudinal virtual lines, which extend along a north-south direction on the earth's surface and which are spaced from each other in an east-west direction on the earth's surface by a prescribed distance (2 Km), cross a plurality of longitudinal virtual lines, which extend along the east-wet direction on the earth's surface and which are spaced from each other in the north-south direction on the earth's surface by a prescribed distance (2 Km). In addition, the meteorological GPV data are delivered online as the meteorological data at the respective parent grid point positions which comprise a total of 51 hours of data obtained at 3-hour intervals, such as at the start of delivery, 3 hours after delivery, 6 hours after delivery, and 9 hours after delivery.

The above-mentioned meteorological data at the parent grid point positions, as the meteorological GPV data, are presented at a long distance of 2 Km between the parent grid point positions in terms of space, and at a long interval of 3 hours in terms of time. Thus, the diffusion concentrations of the diffused substance cannot be computed only based on the gas status (wind direction, wind speed) data shown by the meteorological data at these parent grip point positions.

Hence, there is need to determine the gas status (wind direction, wind speed, etc.), which is detailed in terms of time as well as space, from the meteorological observation data rough spatially and rough in terms of time, by performing computations according to partial differential equations for analyzing atmospheric phenomena.

A description will now be presented of a conventional gas status forecast method which determines a gas status (wind direction, wind speed, etc.), which is detailed in terms of space and time, from the meteorological observation data rough in terms of space and time, by performing computations using partial differential equations for analyzing atmospheric phenomena.

According to the conventional technology, as shown in FIG. 8, child grid point positions (indicated by □ and ■ in the drawing) are set between parent grid point positions (indicated by ○ in the drawing) set in calculation areas to be calculated (specific areas preset in the earth's surface). The parent grid point positions, as stated earlier, are arranged at the locations where a plurality of latitudinal virtual lines, which extend along the north-south direction on the earth's surface and which are spaced from each other in the east-west direction on the earth's surface by a distance of 2 Km, cross a plurality of longitudinal virtual lines, which extend along the east-wet direction on the earth's surface and which are spaced from each other in the north-south direction on the earth's surface by a distance of 2 Km.

The child grid point positions, on the other hand, are arranged at the locations where a plurality of latitudinal virtual lines, which extend along the north-south direction on the earth's surface and which are spaced from each other in the east-west direction on the earth's surface by a constant distance (50 m), cross a plurality of longitudinal virtual lines, which extend along the east-wet direction on the earth's surface and which are spaced from each other in the north-south direction on the earth's surface by a constant distance (50 m).

In FIG. 8, only four of the parent grid point positions are shown, but these parent grid point positions are set so as to be distributed and arranged all over the calculation area. In FIG. 8, moreover, the child grid point positions are shown only in the area surrounded by the four parent grid point positions, but these child grid point positions are set so as to be distributed and arranged all over the calculation area.

As an example, a case in which computation was started 10 minutes after the time of online delivery of the meteorological GPV data will be described, as shown in FIG. 9.

[1] Computation of meteorological data at the start of computation is carried out in the following manner:

[1-1] The meteorological data at the parent grid point position I are obtained by time interpolation computation of the meteorological GPV data at the parent grid point position I 10 minutes before the start of computation (i.e., the time of delivery of meteorological GPV data), and the meteorological GPV data at the parent grid point position I 2 hours and 50 minutes after the start of computation (i.e., 3 hours after delivery of meteorological GPV data). The time interpolation computation is a method for obtaining data according to time, based on the meteorological GPV data at the time of delivery and the meteorological GPV data 3 hours after delivery, such that the data at midpoint in terms of time (i.e., 1 hour and 30 minutes after delivery) is the average of both meteorological GPV data, the data at a point in time nearer the time of delivery is closer to the meteorological GPV data at the time of delivery, and the data at a point in time nearer the point in time 3 hours after delivery is closer to the meteorological GPV data obtained 3-hours after delivery.

Similarly, the meteorological data at the parent grid point position II are obtained by time interpolation computation of the meteorological GPV data at the parent grid point position II 10 minutes before the start of computation (i.e., the time of delivery of meteorological GPV data), and the meteorological GPV data at the parent grid point position II 2 hours and 50 minutes after the start of computation (i.e., 3 hours after delivery).

Likewise, the meteorological data at the parent grid point positions III and IV are also obtained by time interpolation computation.

[1-2] The meteorological data at the child grid point positions (the positions indicated by □ and ■ in FIG. 8) are obtained by space interpolation computation of the meteorological GPV data at the parent grid point positions. For example, the meteorological data at the child grid point position a is obtained by space interpolation computation of the meteorological GPV data at the parent grid point position I and the meteorological GPV data at the parent grid point position II. The space interpolation computation is a method for obtaining meteorological data according to a space distance, based on the meteorological GPV data at the parent grid point position I and the meteorological GPV data at the parent grid point position II, such that the data at midpoint in terms of space (i.e., the position 1 Km away from the parent grid point position) is the average of both meteorological GPV data, the data at a spatial point nearer the parent grid point position I is closer to the meteorological GPV data at the parent grid point position I, and the data at a spatial point nearer the parent grid point position II is closer to the meteorological GPV data at the parent grid point position II.

The meteorological data at the other child grid point positions (the positions indicated by □ and ■ in FIG. 8) are also obtained by space interpolation computation of the meteorological data at the parent grid point positions I, II, III and IV.

[2] Computation of meteorological data to be obtained 10 minutes after the start of computation is carried out in the following manner:

[2-1] The meteorological data at the parent grid point positions I, II, III and IV 10 minutes after the start of computation are obtained by time interpolation computation of the meteorological GPV data at the parent grid point positions I, II, III and IV 10 minutes before the start of computation (i.e., the time of delivery of meteorological GPV data), and the meteorological GPV data at the parent grid point positions I, II, III and IV 2 hours and 50 minutes after the start of computation (i.e., 3 hours after delivery).

[2-2] Of the data at the child grid point positions 10 minutes after the start of computation, the data at those positions indicated by □ in the drawing, namely, those held between the parent grid point positions I, II, III and IV, are obtained by space interpolation computation of the meteorological data at the parent grid point positions I, II, III and IV 10 minutes after the start of computation that have been obtained by time interpolation computation.

[2-3] Of the data at the child grid point positions 10 minutes after the start of computation, the data at those positions indicated by ■ in the drawing, namely, th meteorological data at the child grid point positions within the range surrounded by the parent grid point positions and the child grid point positions indicated by □ in the drawing are obtained by difference analysis computation according to partial differential equations, which analyze atmospheric phenomena. As the partial differential equations for analyzing atmospheric phenomena, there can be used fundamental equations for wind speed site analysis which are represented by the RAMS (Regional Atmospheric Modeling System) code developed by Colorado State University and Mission Research.

The fundamental equations for wind speed site analysis, represented in the RAMS code, comprise equations of motion, an equation of thermal energy, an equation of moisture diffusion, and an equation of continuity, and are expressed as the following equations (1) to (6):

Equations of motion $$\frac{\partial u}{\partial t} = -u\frac{\partial u}{\partial x} - v\frac{\partial u}{\partial y} - w\frac{\partial u}{\partial z} - \theta\frac{\partial \pi'}{\partial x} + \qquad (1)$$

$$fv + \frac{\partial}{\partial x}\left(K_m\frac{\partial u}{\partial x}\right) + \frac{\partial}{\partial y}\left(K_m\frac{\partial u}{\partial y}\right) + \frac{\partial}{\partial z}\left(K_m\frac{\partial u}{\partial z}\right)$$

$$\frac{\partial v}{\partial t} = -u\frac{\partial v}{\partial x} - v\frac{\partial v}{\partial y} - w\frac{\partial v}{\partial z} - \theta\frac{\partial \pi'}{\partial y} - \qquad (2)$$

$$fu + \frac{\partial}{\partial x}\left(K_m\frac{\partial v}{\partial x}\right) + \frac{\partial}{\partial y}\left(K_m\frac{\partial v}{\partial y}\right) + \frac{\partial}{\partial z}\left(K_m\frac{\partial v}{\partial z}\right)$$

$$\frac{\partial w}{\partial t} = -u\frac{\partial w}{\partial x} - v\frac{\partial w}{\partial y} - w\frac{\partial w}{\partial z} - \theta\frac{\partial \pi'}{\partial z} - \qquad (3)$$

$$\frac{g\theta'_v}{\theta_0} + \frac{\partial}{\partial x}\left(K_m\frac{\partial w}{\partial x}\right) + \frac{\partial}{\partial y}\left(K_m\frac{\partial w}{\partial y}\right) + \frac{\partial}{\partial z}\left(K_m\frac{\partial w}{\partial z}\right)$$

Equation of thermal energy $$\frac{\partial \theta_{il}}{\partial t} = -u\frac{\partial \theta_{il}}{\partial x} - v\frac{\partial \theta_{il}}{\partial y} - w\frac{\partial \theta_{il}}{\partial z} + \qquad (4)$$

$$\frac{\partial}{\partial x}\left(K_h\frac{\partial \theta_{il}}{\partial x}\right) + \frac{\partial}{\partial y}\left(K_h\frac{\partial \theta_{il}}{\partial y}\right) + \frac{\partial}{\partial z}\left(K_h\frac{\partial \theta_{il}}{\partial z}\right) + \left(\frac{\partial \theta_{il}}{\partial t}\right)_{rad}$$

Equation of moisture diffusion $$\frac{\partial r_n}{\partial t} = \qquad (5)$$

$$-u\frac{\partial r_n}{\partial x} - v\frac{\partial r_n}{\partial y} - w\frac{\partial r_n}{\partial z} + \frac{\partial}{\partial x}\left(K_h\frac{\partial r_n}{\partial x}\right) + \frac{\partial}{\partial y}\left(K_h\frac{\partial r_n}{\partial y}\right) + \frac{\partial}{\partial z}\left(K_h\frac{\partial r_n}{\partial z}\right)$$

Equation of continuity $$\frac{\partial \pi'}{\partial t} = -\frac{R\pi_0}{c_v\rho_0\theta_0}\left(\frac{\partial \rho_0\theta_0 u}{\partial x} + \frac{\partial \rho_0\theta_0 v}{\partial y} + \frac{\partial \rho_0\theta_0 w}{\partial z}\right) \qquad (6)$$

where u, v, w: wind speeds f: Corioli's parameter
$K_m$: eddy viscosity coefficient of momentum
$K_h$: eddy diffusion coefficient of heat and moisture
$\theta_{il}$: potential temperature of moisture (ice-water)
$r_n$: mixing ratio of moisture such as rain or snow
$\rho$: density
rad: radiation
g: gravitational acceleration
$\pi'$: Exner function (change)
$\theta_v$: temporary potential temperature
p: pressure
R: gas constant
$C_v$: isovolumic specific heat
Subscript 0: reference value For example, the meteorological data at the child grid point position α 10 minutes after the start of computation is obtained, as a difference solution, by difference solution computation according to the fundamental equations (1) to (6) for wind speed site analysis represented by the RAMS code, with the meteorological data at the child grid point position a at the start of computation being taken up as an initial condition value, and with the meteorological data at the parent grid point position 10 minutes after the start of computation and at the child grid point position shown by □ in the drawing being taken up as boundary condition values. The data at the other child grid point positions shown by ■ in the drawing are similarly obtained, as difference solutions, by difference solution computation according to the fundamental equations (1) to (6) for wind speed site analysis represented by the RAMS code.

[3] Computation of the meteorological data to be obtained 20 minutes after the start of computation is carried out in the same manner as the computation of the meteorological data 10 minutes after the start of computation.

[3-1] That is, the meteorological data at the parent grid point positions I, II, III and IV 20 minutes after the start of computation are obtained by time interpolation computation of the meteorological GPV data at the parent grid point positions I, II, III and IV 10 minutes before the start of computation (i.e., the time of delivery of meteorological GPV data), and the meteorological GPV data at the parent grid point positions I, II, III and IV 2 hours and 50 minutes after the start of computation (i.e., 3 hours after delivery).

[3-2] Of the data at the child grid point positions 20 minutes after the start of computation, the data at those positions indicated by □ in the drawing, namely, those positions held between the parent grid point positions I, II, III and IV, are obtained by space interpolation computation of the meteorological data at the parent grid point positions I, II, III and IV 20 minutes after the start of computation that have been obtained by time interpolation computation.

[3-3] Of the data at the child grid point positions 20 minutes after the start of computation, the data at those positions indicated by ■ in the drawing, namely, the meteorological data at the child grid point positions within the range-surrounded by the parent grid point positions and the child grid point positions indicated by n in the drawing, are obtained by difference analysis computation according to partial differential equations which analyze atmospheric phenomena. As the partial differential equations for analyzing atmospheric phenomena, there can be used the fundamental equations for wind speed site analysis which are expressed by the RAMS (Regional Atmospheric Modeling System) code developed by Colorado State University and Mission Research.

For example, the meteorological data at the child grid point position a 20 minutes after the start of computation is obtained, as a difference solution, by difference solution computation according to the fundamental equations (1) to (6) for wind speed site analysis represented by the RAMS code, with the meteorological data at the child grid point position a at the start of computation being taken up as an initial condition value, and with the meteorological data at the parent grid point position 20 minutes after the start of computation and at the child grid point position shown by □ in the drawing being taken up as boundary condition values. The data at the other child grid point positions shown by ■ in the drawing are similarly obtained, as difference solutions, by difference solution computation according to the fundamental equations (1) to (6) for wind speed site analysis represented by the RAMS code.

[4] Subsequently, the meteorological data at 10-minute intervals, such as 30 minutes, 40 minutes, 50 minutes and soon after the start of computation, are obtained similarly during the period from the start of computation until 12 hours after computation.

In this manner, there are obtained the meteorological data at a plurality of elevations at the respective par nt grid point positions and the meteorological data at a plurality of elevations at the respective child grid point positions at 10-minute intervals from the start of computation. Then, the meteorological data (wind direction, wind speed) at the respective parent grid point positions and the respective child grid point positions at the intervals of 10 minutes are substituted, one after another, into a diffusion equation (7) for computing the diffused state of the substance, whereby the range of diffusion and the diffusion concentration can be forecast based on the computations.

$$\frac{\partial C}{\partial t} = -u\frac{\partial C}{\partial x} - v\frac{\partial C}{\partial y} - w\frac{\partial C}{\partial z} + \frac{\partial}{\partial x}\left(K_c\frac{\partial C}{\partial x}\right) + \frac{\partial}{\partial y}\left(K_c\frac{\partial C}{\partial y}\right) + \frac{\partial}{\partial z}\left(K_c\frac{\partial C}{\partial z}\right) \tag{7}$$

C: gas concentration
U, V, w: wind speeds

The partial differential equations for analyzing atmospheric phenomena, such as the fundamental equations for wind speed site analysis represented by the RAMS code, are subjected to difference solution analysis computation using a computer to obtain the meteorological data at the child grid point positions shown by ■ in FIG. 8. A calculation system available for this computation is expressed as a dynamic system, which is shown in FIG. 10.

According to this calculation system, as shown in FIG. 10, difference calculations are made unsteadily using the partial differential equations, starting at the time when initial conditions were given (i.e., t=t0) and at fine time intervals ($\delta t$), under boundary conditions varying with time (t). As a result, variables (vi: wind direction, wind speed, atmospheric temperature, moisture content) at respective points in time (ti=t0+n×$\delta$t: n=0~N) are outputted as numerical solutions.

In further detail, initial conditions are entered from a block B1, which is an initial condition input system, into a block B2, which is a calculation system, in FIG. 10. In the example of FIG. 9, computation is started 10 minutes after delivery of the meteorological GPV data. Thus, the initial conditions at this start of computation (i.e., meteorological data at the parent grid point positions and the child grid point positions) are inputted into the calculation system. As stated earlier, the initial conditions (meteorological data at the parent grid point positions and the child grid point positions at the start of computations) are found by time interpolation computation and space interpolation computation of the meteorological GPV data.

A block B3, which is a timer system, advances the computation point of time by one computation time interval (10 minutes in the examples of FIG. 8 and FIG. 9), after computation in one computation time interval by the block B2 as the calculation system is completed.

A block B4, which is a boundary condition input system, enters the boundary conditions (meteorological data at the parent grid point positions and the child grid point positions shown by □ in FIG. 8) at constant time intervals (10-minute intervals in the examples of FIGS. 8 and 9) into the calculation system B2. The boundary conditions (meteorological data at the parent grid point positions and the child grid point positions shown by □ in FIG. 8) are found by time interpolation computation and space interpolation computation of the meteorological GPV data, as described above.

Numerical analysis based on the partial differential equations for analysis of atmospheric conditions (fundamental equations for wind speed site analysis expressed in the RAMS code) is made uniquely if the initial conditions and the boundary conditions are determined. Thus, the block 2, the calculation system, captures the initial conditions and the boundary conditions, performs difference analysis for each of the child grid point positions (the child grid point positions shown by ■ in FIG. 8), and outputs difference solutions, which are the meteorological data at the respective child grid point positions (the child grid point positions shown by ■ in FIG. 8), to an output system B5.

By the way, a very long time will be taken, if the child grid point positions are arranged at a short distance (e.g., 50 m) from each other in the whole of a wide calculation area (for example, a large area A1 in FIG. 11) and the meteorological data at all of the child grid point positions are computed with a single computer. As a method for shortening the calculation time, therefore, a multiple nesting method (multiple grid method) to be described below is employed. An area, which requires elaborate or detailed meteorological data, is only a small area A3 in FIG. 11, for example. However, meteorological phenomena vary according to the circumstances in the areas around the necessary small area A3. Thus, the large area A1 wider than the small area A3 is set, and meteorological data at all of the grid point positions in the large area A1 are obtained. Computation by the diffusion equation for computing the state of diffusion is performed using only the meteorological data (wind speed site data) at the grid point positions in the small area A3 out of the large area A1.

According to the multiple nesting method, as shown in FIG. 11, the large area (for example, the central part of the Main Island of Japan) A1, a medium area (for example, the Tokyo district) A2, and the small area (for example, districts in the neighborhood of Tokyo Bay) are set as the calculation areas. The area requiring detailed meteorological data is the small area A3. However, meteorological phenomena vary according to the circumstances in the areas around the necessary area. Thus, the medium area A2 and the large area A1, which are wider than the small area A3, are set.

In the large area A1, parent grid point positions (indicated by ○ in the drawing) separated, for example, by a distance of 4 Km, and child grid point positions (indicated by □ in the drawing) separated, for example, by a distance of 800 m are set as shown in FIG. 12.

In the medium area A2, parent grid point positions (indicated by ○ in the drawing) separated, for example, by a distance of 2 Km, and child grid point positions (indicated by □ in the drawing) separated, for example, by a distance of 400 m are set as shown in FIG. 13.

In the small area A3, which finally requires elaborate or detailed meteorological data, parent grid point positions (indicated by ○ in the drawing) separated, for example, by a distance of 2 Km, and child grid point positions (indicated by □ and ■ in the drawing) separated, for example, by a distance of 50 m are set as shown in FIG. 8.

First, the meteorological data at the parent grid point positions separated by a distance of 4 Km and the child grid point positions separated by a distance of 800 m, set in the large area A1, are computed according to the calculation system shown in FIG. 10.

Then, the meteorological data at the parent grid point positions separated by a distance of 2 Km and the child grid point positions separated by a distance of 400 m, set in the medium area A2, are computed according to the calculation system shown in FIG. 10. Of the meteorological data at the parent grid point positions set in the medium area A2, those at the same positions as the parent grid point positions set in the large area A1 have already been obtained in the computation for the large area A1. Thus, those meteorological data are shifted, unchanged, to the computation for the medium area A2. Of the meteorological data at the child grid point positions separated by a distance of 400 m, those at the same positions as the child grid point positions set in the large area A1 have already been obtained in the computation for the large area A1. Thus, those meteorological data are shifted, unchanged, to the computation for the medium area A2.

Further, the meteorological data at the child grid point positions separated by a distance of 50 m, set in the small area A3, are computed according to the calculation system shown in FIG. 10. The meteorological data at the parent grid point positions set in the small area A3 have already been obtained in the computations for the large area A1 and the medium area A2. Thus, those meteorological data are shifted, unchanged, to the computation for the small area A3. Of the meteorological data at the child grid point positions separated by a distance of 50 m, those at the same positions as the child grid point positions set in the large area A1 and the medium area A2 have already been obtained in the computations for the large area A1 and the medium area A2. Thus, those meteorological data are shifted, unchanged, to the computation for the small area A3.

As described above, the child grid point positions separated by a short distance (e.g., 50 m) are set only in the small area A3 which finally requires detailed meteorological data. Thus, the computation time is shortened as compared with the computation after setting of the child grid point positions separated by a short distance (e.g., 50 m) in the whole of the large area A1.

For a further reduction of the computation time, when the multistage nesting method is employed, it is common practice to perform parallel computing by a parallel computer composed of a plurality of processing units (CPU) combined together.

When parallel computing is to be performed using four CPU's, for example, the large area A1 is divided into four divisional areas A1-1, A1-2, A1-3 and A1-4, the medium area A2 is divided into four divisional areas A2-1, A2-2, A2-3 and A2-4, and the small area A3 is divided into four divisional areas A3-1, A3-2, A3-3 and A3-4, as shown in FIG. 14.

To compute the meteorological data at the respective grid point positions arranged in the large area A1 (for example, the meteorological data, for example, at 10-minute intervals during the period from the start of computation until the point of time, 12 hours later), the first CPU computes the meteorological data at the respective grid point positions arranged in the divisional area A1-1, the second CPU computes the meteorological data at the respective grid point positions arranged in th divisional area A1-2, the third CPU computes the meteorological data at the respective grid point positions arranged in the divisional area A1-3, and the fourth CPU computes the meteorological data at the respective grid point positions arranged in the divisional area A1-4.

After the computing for the large area A1 is completed, there are computed the meteorological data at the respective grid point positions arranged in the medium area A2 (for example, the meteorological data, for example, at 10-minute intervals during the period from the start of computation until the point of time, 12 hours later). For this purpose, the first CPU computes the meteorological data at the respective grid point positions arranged in the divisional area A2-1, the second CPU computes the meteorological data at the respective grid point positions arranged in the divisional area A2-2, the third CPU computes the meteorological data at the respective grid point positions arranged in the divisional area A2-3, and the fourth CPU computes the meteorological data at the respective grid point positions arranged in the divisional area A2-4.

Furthermore, after the computing for the medium area A2 is completed, there are computed the meteorological data at the respective grid point positions arranged in the small area A3 (for example, the meteorological data, for example, at 10-minute intervals during the period from the start of computation until the point of time, 12 hours later). For this purpose, the first CPU computes the meteorological data at the respective grid point positions arranged in the divisional area A3-1, the second CPU computes the meteorological data at the respective grid point positions arranged in the divisional area A3-2, the third CPU computes the meteorological data at the respective grid point positions arranged in the divisional area A3-3, and the fourth CPU computes the meteorological data at the respective grid point positions arranged in the divisional area A3-4.

A diffusion status forecast system, which forecasts the diffusion status of a substance by utilizing the wind speed site data obtained by the above-described gas status forecast method, can be utilized to forecast the diffusion status of smoke and fumes occurring during volcanic eruption, or the diffusion status of volatile gases vaporized from a leaked oil in a tanker running aground.

This diffusion status forecast system can be utilized not only in making a forecast by performing computations immediately after occurrence of an event (for example, an accident of nuclear substance release to the outside), but also in forecasting the diffusion status in order to analyze the situation retrospectively after the occurrence of the event. For example, if an accident of nuclear substance release to the outside occurred, it is impossible to enter the spot of occurrence even after several days. However, this system can be utilized to forecast the status of diffusion, and an appropriate action can be taken based on the forecast diffusion status.

According to the conventional gas status forecast method, it is common practice to use a parallel computer comprising a plurality of CPU's in combination, divide the calculation area into the same number of areas as the number of the CPU's, make calculations for the respective divisional areas by use of the respective CPU's, and output variables ($v_i$) for the respective time intervals ($t_i$) as difference solutions, thereby reducing the computation time. However, when the number of the CPU's is increased, there is an increase in the duration of data transfer among the respective divisional areas, so that the total calculation time has not been decreased in accordance with (in inverse proportion to) the number of the CPU's. In other words, even if four of the CPU's are used, the total calculation time is not reduced to ¼ of the time taken when the number of the CPU's is one. An amount of time, such as the data transfer time, is needed, making the total calculation time longer than when the number of the CPU's is one.

In the light of the conventional technology, the present invention is aimed at providing a gas status forecast method which can shorten the calculation time in accordance with an increase in the number of processing units (CPU), and which is also able to find the exact gas status by ensuring the continuity of gas status data obtained by the plural processing units.

DISCLOSURE OF THE INVENTION

To attain the above object, the gas status forecast method of the present invention is designed to be a gas status forecast method for obtaining, from meteorological observation data at intervals of a prescribed time at parent grid point positions, meteorological data at intervals of a constant time, which are shorter than the intervals of the prescribed time, at child grid point positions, the parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance, the child grid point positions being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-wet direction on the earth's surface and which are spaced from each other in the north-south direction on the earth's surface by a constant distance shorter than the prescribed distance, the gas status forecast method involving solving partial differential equations for analysis of atmospheric phenomena by computations using a parallel computer equipped with a plurality of processing units, and comprising determining initial conditions and boundary conditions from the meteorological observation data at the parent grid point positions within a specific region preset in the earth's surface, incorporating the determined initial conditions and boundary conditions into the partial differential equations, and performing computations according to the partial differential equations to obtain the meteorological data at the child grid point positions within the specific region, the gas status forecast method further comprising dividing a computation period from start of computation until a predetermined time later into a plurality of divisional computation periods, allocating computations for the respective divisional computation periods to the plurality of processing units, and proceeding with the computations simultaneously and parallelly.

Thus, the computing time can be decreased according to the number of divisions of the computation period, namely, in inverse proportion to the number of the divisions. Hence, as the number of the processing units of the parallel computer is increased, the computing time can be shortened.

The gas status forecast method of the present invention is also designed to be a gas status forecast method for obtaining, from meteorological observation data at intervals of a prescribed time at parent grid point positions, meteorological data at intervals of a constant time, which are shorter than the intervals of the prescribed time, at child grid point positions, the parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance, the child grid point positions being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-west direction on the earth's surface and which are spaced from each other in the north-south direction on the earth's surface by a constant distance shorter than the prescribed distance, the gas status forecast method involving solving partial differential equations for analysis of atmospheric phenomena by computations using a parallel computer equipped with a plurality of processing units, and comprising:

presetting in the earth's surface a specific region and a plurality of enlarged regions including the specific region inside and having areas progressively increased over the area of the specific region;

determining initial conditions and boundary conditions in the enlarged regions and the specific region from the meteorological observation data at the parent grid point positions within the enlarged regions and the specific region; and incorporating the determined initial conditions and boundary conditions into the partial differential equations, and performing computations according to the partial differential equations to obtain the meteorological data at the child grid point positions, in such a manner as to perform the computations in the enlarged region with the largest area to the enlarged region with the smallest area sequentially, and then perform the computations in the specific region, the gas status forecast method further comprising dividing a computation period from start of computation until a predetermined time later into a plurality of divisional computation periods, allocating computations for the respective divisional computation periods to the plurality of processing units, and proceeding with the computations simultaneously and parallelly.

As described above, with the so-called multistage nesting method being employed, the computation period is divided, and computations are carried out for the divisional computation periods simultaneously and parallelly by the plurality of processing units. Thus, the computing time can be decreased according to the number of divisions of the computation period, namely, in inverse proportion to the number of the divisions, and accurate computations can be performed. Hence, as the number of the processing units installed in the parallel computer is increased, the computing time can be shortened, and the accuracy of the computations is improved.

In this case, when the computations for the respective divisional computation periods are allocated to the plurality of processing units and performed simultaneously and parallelly, the enlarged regions and the specific region can be further divided into a plurality of divisional regions, and the computations for the divisional regions can be allocated to the plurality of processing units and performed simultaneously and parallelly. By so doing, a further reduction in the computing time can b achieved.

The gas status forecast method of the present invention is also designed to be a gas status forecast method for obtaining, from meteorological observation data at intervals of a prescribed time at parent grid point positions, meteorological data at intervals of a constant time, which are shorter than the intervals of the prescribed time, at child grid point positions, the parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance, the child grid point positions being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-wet direction on the earth's surface and which are spaced from each other in the north-south direction on the earth's surface by a constant distance shorter than the prescribed distance, the gas status forecast method involving solving partial differential equations for analysis of atmospheric phenomena by computations using a parallel computer equipped with a plurality of processing units, and comprising:

presetting in the earth's surface a specific region and a plurality of enlarged regions including the specific region inside and having areas progressively increased over the area of the specific region;

determining initial conditions and boundary conditions in the enlarged regions and the specific region from the meteorological observation data at the parent grid point positions within the enlarged regions and the specific region; and incorporating the determined initial conditions and boundary conditions into the partial differential equations, and performing computations according to the partial differential equations to obtain the meteorological data at the child grid point positions, in such a manner as to perform the computations in the enlarged region with the largest area to the enlarged region with the smallest area sequentially, and then perform the computations in the specific region, the gas status forecast method further comprising:
proceeding with the computations for the enlarged region with the largest area throughout a computation period from start of computation until a predetermined time later; and proceeding with the computations for the enlarged region with an area smaller than the largest area and the specific region in such a manner as to divide the computation period from the start of computation until the predetermined time later into a plurality of divisional computation periods, allocate the computations for the respective divisional computation periods to the plurality of processing units, and perform the computations simultaneously and parallelly.

Thus, the data at the points in time of division for the divisional computation periods are continuous, and meteorological data can be computed accurately.

In this case, when proceeding with the computations for the enlarged region with the largest area throughout the computation period from the start of computation until the predetermined time later, the enlarged region can be further divided into a plurality of divisional regions, and the computations for the divisional regions can be allocated to the plurality of processing units and performed simultaneously and parallelly, and when proceeding with the computations for the enlarged region with the area smaller than the largest area and the specific region in such a manner as to allocate the computations for the respective divisional computation periods to the plurality of processing units, and perform the computations simultaneously and parallelly, the enlarged region with the area smaller than the largest area and the specific region can be further divided into a plurality of divisional regions, and the computations for the divisional regions can be allocated to the plurality of processing units and performed simultaneously and parallelly.

By so doing, the data at the points in time of division for the divisional computation periods become continuous, meteorological data can be computed accurately, and the reduction of the computing time can be achieved.

BRIEF DESCRIPTION OF THE DRAWINGS

FIG. 4 is an explanation drawing showing a method of computation in a third embodiment of the present invention.

FIG. 11 is an explanation drawing showing a large area, a medium area, and a small area.

BEST MODE FOR CARRYING OUT THE INVENTION

Embodiments of the present invention will be described in detail below based on the accompanying drawings.
<First Embodiment>

In the first embodiment, meteorological data at the child grid point positions are obtained from meteorological observation data (for example, meteorological GPV data). For this purpose, the fundamental equations for wind speed site analysis (the aforementioned equations (1) to (6)) expressed in the RAMS code, which are partial differential equations for analyzing atmospheric phenomena, are solved by computation using a parallel computer having a plurality of processing units. In this case, the period of computation is divided, and computations in the divisional computation periods provided by division are allocated to the plural processing units and are allowed to proceed simultaneously and in parallel.

Figure 1:
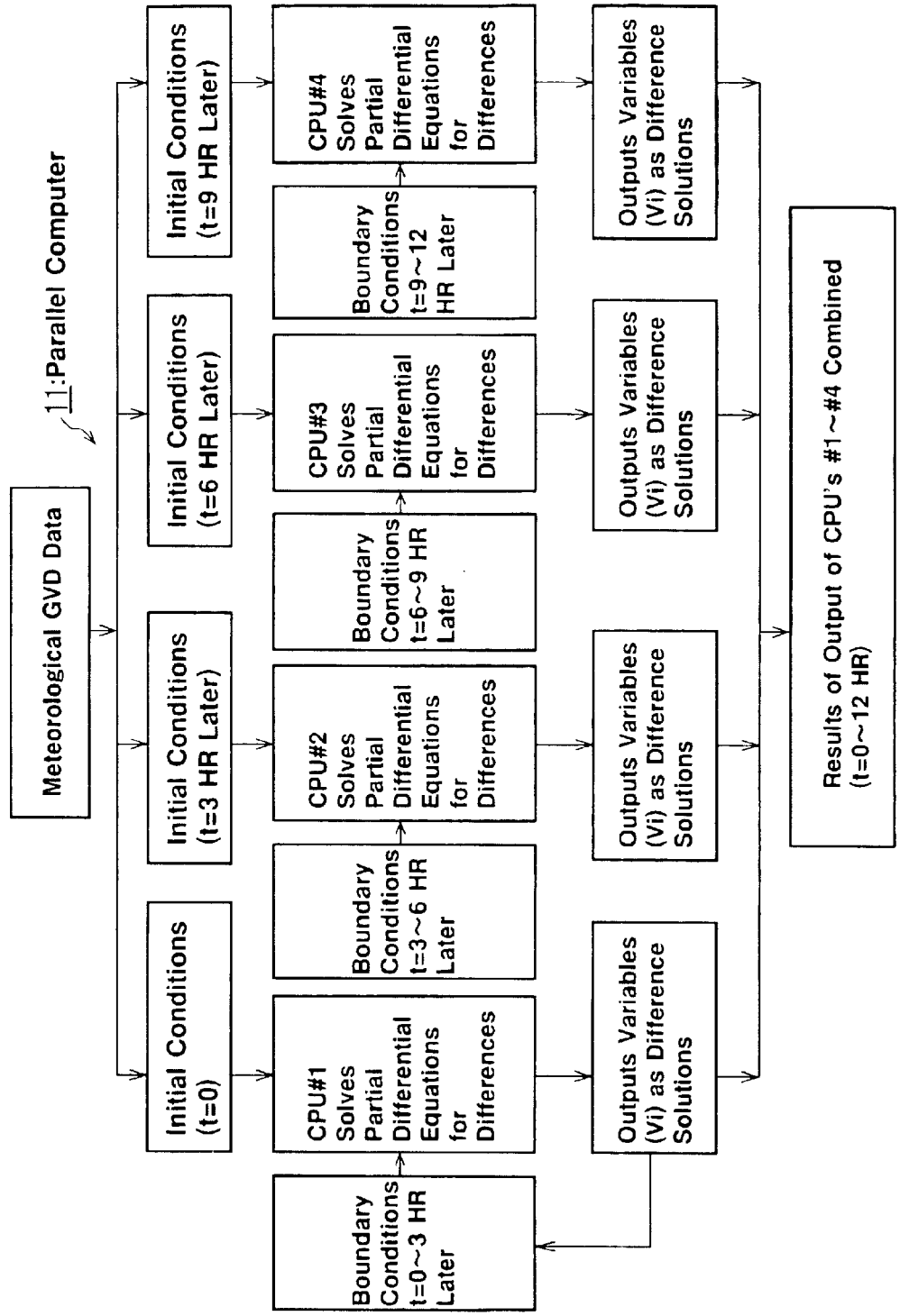
FIG. 1 is a system block diagram showing a parallel computer for realizing a first embodiment of the present invention.

As shown in FIG. 1, a parallel computer 11 is equipped with four processing units (CPU's) #1 to #4. In the calculation area, parent grid point positions separated from each other by a distance of 2 Km and child grid point positions separated from each other by a distance of 50 m are set. Here, meteorological data at the child grid point positions at intervals of 10 minutes (at intervals of a constant time) are computed during the period of computation (t=0 to 12 hours later) from the start of computation until 12 hours later.

In the parallel computer 11, time interpolation computation and space interpolation-computation of meteorological GPV data are carried out to determine boundary conditions in the calculation area. The meteorological GPV data are also subjected to time interpolation computation and space interpolation computation to determine initial conditions at the respective points of time, i.e., the start of computation, 3 hours after the start of computation, 6 hours after the start of computation, and 9 hours after the start of computation. The methods of computation for the boundary conditions and the initial conditions are the same as described in connection with the prior art.

Further, the computation period (12 hours) is divided into four parts. Computations to solve the fundamental equations (the aforementioned equations (1) to (6)) for wind speed site analysis indicated by the RAMS code are allocated as in ①  to ④ below for the divisional computation periods assigned to the four CPU's #1~#4, and these computations by the four CPU's #1~#4 are carried out simultaneously and parallelly.

① The computation in the first divisional computation period from the start of computation to 3 hours later is performed by the first CPU #1 to obtain meteorological data at the respective child grid point positions at 10-minute intervals in the first computation period.

② The computation in the second divisional computation period from the point in time, 3 hours after the start of computation, to the point in time, 6 hours after the start of computation, is performed by the second CPU #2 to obtain meteorological data at the respective child grid point positions at 10-minute intervals in the second computation period.

③ The computation in the third divisional computation period from the point in time, 6 hours after the start of computation, to the point in time, 9 hours after the start of computation, is performed by the third CPU #3 to obtain meteorological data at the respective child grid point positions at 10-minute intervals in the third computation period.

④ The computation in the fourth divisional computation period from the point in time, 9 hours after the start of computation, to the point in time, 12 hours after the start of computation, is performed by the fourth CPU #4 to obtain meteorological data at the respective child grid point positions at 10-minute intervals in the fourth computation period.

That is, the initial conditions at the start of computation, and the boundary conditions at 10-minute intervals in the first divisional computation period from the start of computation until 3 hours later are inputted into the CPU#1. Difference solutions are computed using the fundamental equations for wind speed site analysis represent d by the RAMS code which are partial differential equations for analyzing atmospheric phenomena. As a result, variables (Vi) are outputted as difference solutions (namely, meteorological data at the respective child grid point positions at 10-minute intervals).

Similarly, the initial conditions at the respective points in time, i.e. 3 hours after the start of computation, 6 hours after the start of computation, and 9 hours after the start of computation, and the boundary conditions at 10-minute intervals in the second to fourth divisional computation periods are inputted into the CPU's #2, #3 and #4, respectively. Difference solutions are computed using the fundamental equations for wind speed site analysis represented by the RAMS code which are partial differential equations for analyzing atmospheric phenomena. As a result, variables (Vi) are outputted as difference solutions (namely, meteorological data at the respective child grid point positions at 10-minute intervals in the second to fourth divisional computation periods).

Then, the meteorological data obtained by the CPU's #1~#4 are combined together, whereby there can be obtained the meteorological data at the respective child grid point positions at 10-minute intervals in the 12-hour computation period from the start of computation until 12 hours later.

In the foregoing manner, the computation period is divided into four parts according to the number of the CPU's installed, and computations in the four divisional computation periods are allocated to the plural CPU's #1~#4 and carried out simultaneously and parallelly. Thus, the computing time can be quart red as compared with the computing time by one CPU.

It goes without saying that as the number of CPU's installed is increased and the number of divisions of the computation period is increased, the computing time is shortened. For example, if the number of CPU's installed is set at M and the number of divisions of the computation period is set at M, followed by parallel computing, then the computing time is reduced to 1/M.

As the meteorological observation data, other meteorological observation data, such as those from AMEDAS, can be adopted in addition to the meteorological GPV data. The distance by which the parent grid point positions are separated from each other, and the distance by which the child grid point positions are separated from each other can also be set at other values. Moreover, as the partial differential equations for analysis of atmospheric phenomena, other partial differential equations can be employed, in addition to the fundamental equations for wind speed site analysis indicated in the RAMS code. These situations are true of other embodiments.

<Second Embodiment>

The second embodiment is a development from the first embodiment, and adopts the multistage nesting method for calculations by the CPU's #1~#4. In the present embodiment, meteorological data at the child grid point positions in the respective regions set by the multistage nesting method are obtained from meteorological observation data (for example, meteorological GPV data). For this purpose, the fundamental equations for wind speed site analysis (the aforementioned equations (1) to (6)) expressed in the RAMS code, which are partial differential equations for analyzing atmospheric phenomena, are solved by computation using a parallel computer having a plurality of processing units. In this case, the computing time is divided, and computations in the divisional computing times provided by division are allocated to the plural processing units and are allowed to proceed simultaneously and in parallel.

Figure 2:
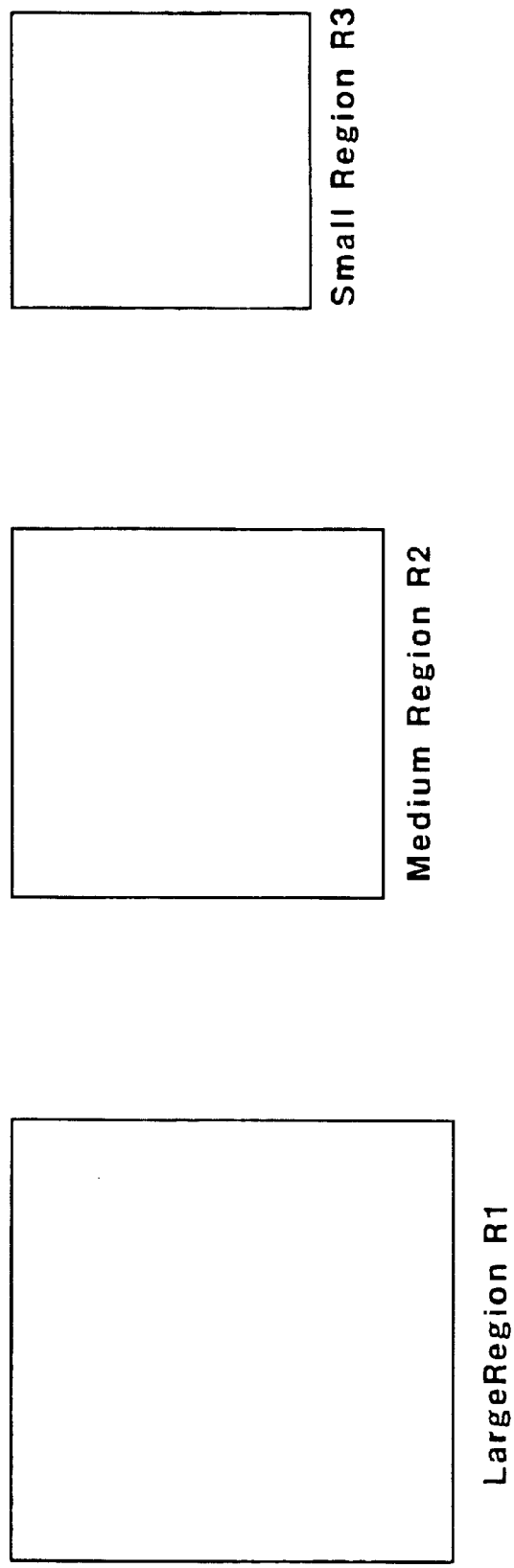
FIG. 2 is an explanation drawing showing regions in a second embodiment of the present invention.

In the second embodiment, as shown in FIG. 2, a large region (for example, the central part of the Main Island of Japan) R1 which is an enlarged region with the largest area, a medium region (for example, the Tokyo district) R2 which has an enlarged area narrower than the large region R1, and a small region (for example, districts in the neighborhood of Tokyo Bay) R3 which is a specific region are set as the calculation regions. The areas of these regions are progressively increased such that the region R3 is included within the region R2, and the region R2 is included within the region R1.

Figure 3:
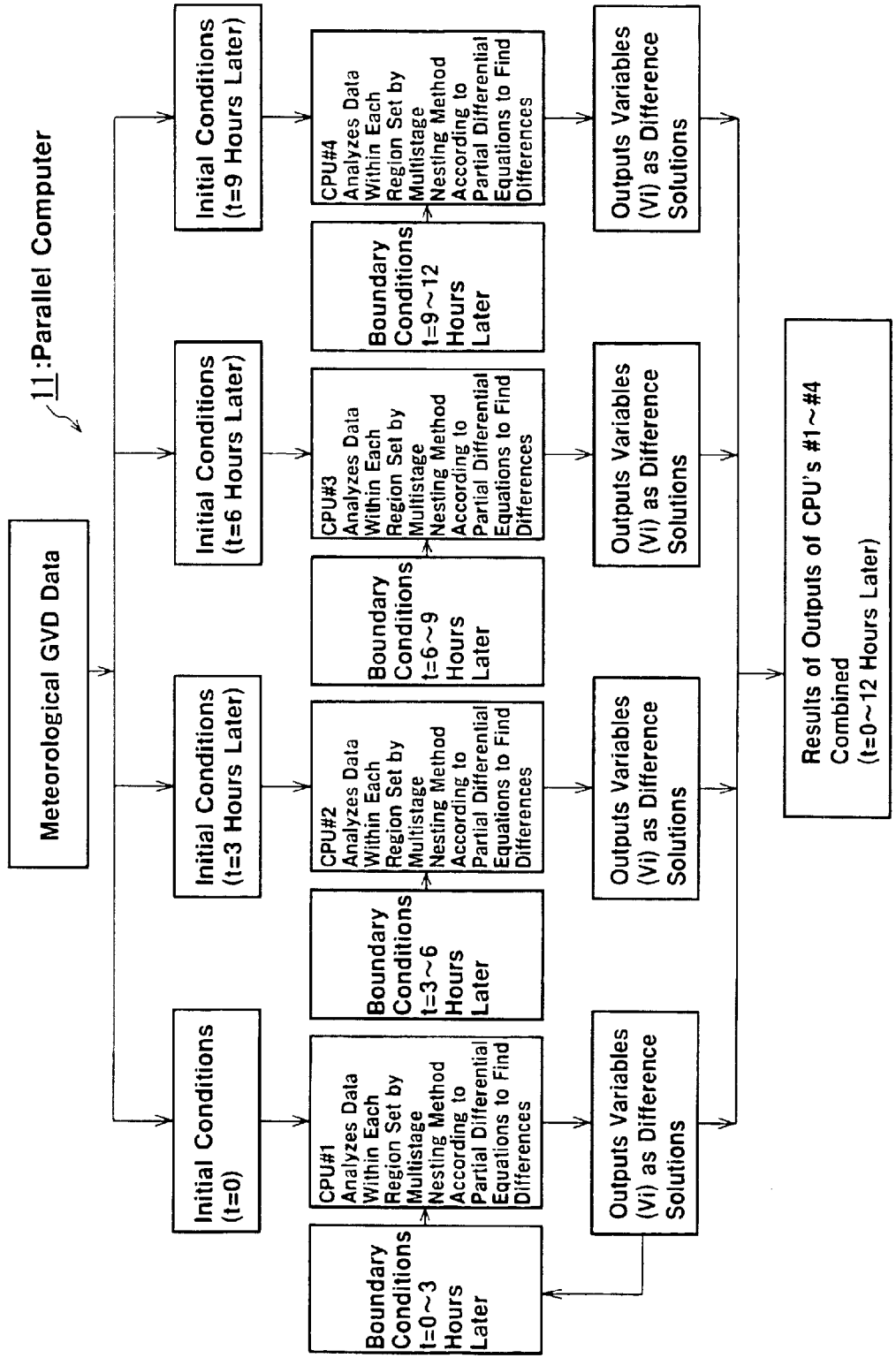
FIG. 3 is a system block diagram showing a parallel computer for realizing the second embodiment of the present invention.

In this second embodiment, as shown in FIG. 3, a parallel computer 11 is equipped with four processing units (CPU's) #1~#4. In the large region R1, parent grid point positions separated, for example, by a distance of 4 Km, and child grid point positions separated, for example, by a distance of 800 m are set. In the medium region R2, parent grid point positions separated, for example, by a distance of 2 Km, and child grid point positions separated, for example, by a distance of 400 m are set. In the small region R3, which finally requires elaborate or detailed meteorological data, parent grid point positions separated, for example, by a distance of 2 Km, and child grid point positions separated, for example, by a distance of 50 m are set. Here, there are computed meteorological data at the child grid point positions at intervals of 10 minutes (at intervals of a constant time) during the period of computation (t=0 to 12 hours later) from the start of computation until 12 hours later.

In the parallel computer 11, time interpolation computation and space interpolation computation of meteorological GPV data are carried out to determine boundary conditions in the regions R1, R2 and R3. The meteorological GPV data are also subjected to time interpolation computation and space interpolation computation to determine initial conditions at the respective points of time, i.e., the start of computation, 3 hours after the start of computation, 6 hours after the start of computation, and 9 hours after the start of computation, in the regions R1, R2 and R3.

Further, the computation period (12 hours) is divided into four parts. The divisional computation periods, in which the four CPU's #1~#4 compute data in the regions R1, R2 and R3 set by the multistage nesting method, are allocated as in ① to ④, and these computations by the four CPU's #1~#4 are carried out simultaneously and parallelly.

① The computation in the first divisional computation period from the start of computation to 3 hours later is performed by the first CPU #1 to obtain meteorological data at the respective child grid point positions at 10-minute intervals in the large region R1 in the first computation period, then obtain meteorological data at the respective child grid point positions at 10-minute intervals in the medium region R2 in the first computation period, and then obtain meteorological data at the respective child grid point positions at 10-minute intervals in the small region R2 in the first computation period.

② The computation in the second divisional computation period from the point in time, 3 hours after the start of computation, to the point in time, 6 hours after the start of computation, is performed by the second CPU #2 to obtain meteorological data at the respective child grid point positions at 10-minute intervals in the large region R1 in the second computation period, then obtain meteorological data at the respective child grid point positions at 10-minute intervals in the medium region R2 in the second computation period, and then obtain meteorological data at the respective child grid point positions at 10-minute intervals in the small region R2 in the second computation period.

③ The computation in the third divisional computation period from the point in time, 6 hours after the start of computation, to the point in time, 9 hours after the start of computation, is performed by the third CPU #3 to obtain meteorological data at the respective child grid point positions at 10-minute intervals in the large region R1 in the third computation period, then obtain meteorological data at the respective child grid point positions at 10-minute intervals in the medium region R2 in the third computation period, and then obtain meteorological data at the respective child grid point positions at 10-minute intervals in the small region R2 in the third computation period.

④ The computation in the fourth divisional computation period from the point in time, 9 hours after the start of computation, to the point in time, 12 hours after the start of computation, is performed by the fourth CPU #4 to obtain meteorological data at the respective child grid point positions at 10-minute intervals in the large region R1 in the fourth computation period, then obtain meteorological data at the respective child grid point positions at 10-minute intervals in the medium region R2 in the fourth computation period, and then obtain meteorological data at the respective child grid point positions at 10-minute intervals in the small region R2 in the fourth computation period.

That is, the initial conditions at the start of computation in the regions R1, R2 and R3, and the boundary conditions at 10-minute intervals in the first divisional computation period from the start of computation until 3 hours later in these regions are inputted into the CPU#1. For the purpose of data computation for the large region R1, difference solutions are computed using the fundamental equations for wind speed site analysis represented by the RAMS code, which are partial differential equations for analyzing atmospheric phenomena. As a result, variables (Vi) are outputted as difference solutions (namely, meteorological data at the respective child grid point positions at 10-minute intervals). Then, the data in the medium region R2 are computed likewise for difference solutions, and variables (Vi) are outputted as difference solutions (namely, meteorological data at the respective child grid point positions at 10-minute intervals). Finally, the data in the small region R1 are computed likewise for difference solutions, and variables (Vi) are outputted as difference solutions (namely, meteorological data at the respective child grid point positions at 10-minute intervals).

Similarly, the initial conditions at the respective points in time, i.e. 3 hours after the start of computation, 6 hours aft r the start of computation, and 9 hours after the start of computation, and the boundary conditions at 10-minute intervals in the second to fourth divisional computation periods are inputted into the CPU's #2, #3 and #4, respectively. To carry out sequential computation for the data in the regions R1, R2 and R3, difference solutions are computed using the fundamental equations for wind speed site analysis represented by the RAMS code which are partial differential equations for analyzing atmospheric phenomena. As a result, variables (Vi) are sequentially outputted as difference solutions (namely, meteorological data at the respective child grid point positions at 10-minute intervals in the second to fourth divisional computation periods) for each of the regions R1, R2 and R3.

Then, the meteorological data obtained by the CPU's #1~#4 are combined together, whereby there can be obtained the meteorological data at the respective child grid point positions at 10-minute intervals in the 12-hour computation period from the start of computation until 12 hours later.

As described above, the multistage nesting method is adopted, so that accurate meteorological data can be obtained in a short time.

Furthermore, the computation period is divided into four parts according to the number of the CPU's installed, and computations in the four divisional computation periods are allocated to the plural CPU's #1~#4 and carried out simultaneously and parallelly. Thus, the computing time can be further shortened.

<Third Embodiment>

The third embodiment is a development from th second embodiment, in which the computation period is divided, and the multistage nesting method is applied in the divisional computation periods. In this case, regions R1, R2 and R3 set by the multistage nesting method are further divided, and calculations for the divided areas are performed simultaneously and parallelly using a plurality of CPU's.

The method of computation in this third embodiment is itself the same as that in the second embodiment. Thus, only the characteristic portions in the third embodiment will be described.

As shown in FIG. 4, the third embodiment adopts sixteen CPU's, CPU#1~CPU#16. The large region R1 set by the multistage nesting method is divided into four parts, regions R1-1, R1-2, R1-3 and R1-4, the medium region R2 is divided into four parts, regions R2-1, R2-2, R2-3 and R2-4, and the small region R3 is divided into four parts, regions R3-1, R3-2, R3-3 and R3-4.

CPU#1~CPU#4 of the first group are in charge of computations for the first divisional period (from the start of computation until 3 hours later), CPU#5~CPU#8 of the second group are in charge of computations for the second divisional period (the period from the point in time, 3 hours after the start of computation, until the point in time, 6 hours after the start of computation), CPU#9~CPU#12 of the third group are in charge of computations for the third divisional period (the period from the point in time, 6 hours after the start of computation, until the point in time, 9 hours after the start of computation), and CPU#13~CPU#16 of the fourth group are in charge of computations for the fourth divisional period (the period from the point in time, 9 hours after the start of computation, until the point in time, 12 hours after the start of computation).

Needless to say, the computations for the first to fourth divisional periods are performed simultaneously and parallelly by the CPU's of the first to fourth groups.

Furthermore, when CPU#1~CPU#4 of the first group carry out computations for the large region R1 in the first divisional computation period, CPU#L performs computations for the region R1-1, CPU#2 performs computations for the region R1-2, CPU#3 performs computations for the region R1-3, and CPU#4 performs computations for the region R1-4. In this manner, CPU#1~CPU#4 carry out computations simultaneously and parallelly. Thus, the computing time is shortened to ¼ as compared with computations being performed with single CPU.

When CPU#1~CPU#4 of the first group carry out computations for the medium region R2 in the first divisional computation period, CPU#1 performs computations for the region R2-1, CPU#2 performs computations for the region R2-2, CPU#3 performs computations for the region R2-3, and CPU#4 performs computations for the region R2-4. In this manner, CPU#1~CPU#4 carry out computations simultaneously and parallelly. Thus, the computing time is shortened to ¼ as compared with computations being performed with single CPU.

When CPU#1~CPU#4 of the first group carry out computations for the small region R3 in the first divisional computation period, CPU#1 performs computations for the region R3-1, CPU#2 performs computations for the region R3-2, CPU#3 performs computations for the region R3-3, and CPU#4 performs computations for the region R3-4. In this manner, CPU#1~CPU#4 carry out computations simultaneously and parallelly. Thus, the computing time is shortened to ¼ as compared with computations being performed with single CPU.

Similarly, the CPU's of the second to fourth groups also carry out computations for the large region R1, the medium region R2 and the small region R3 in the second to fourth divisional periods. In this case, the four CPU's perform computations simultaneously and parallelly for the divisional regions spatially divided from these regions, thereby shortening the computing time to ¼.

<Fourth Embodiment>

Figure 5:
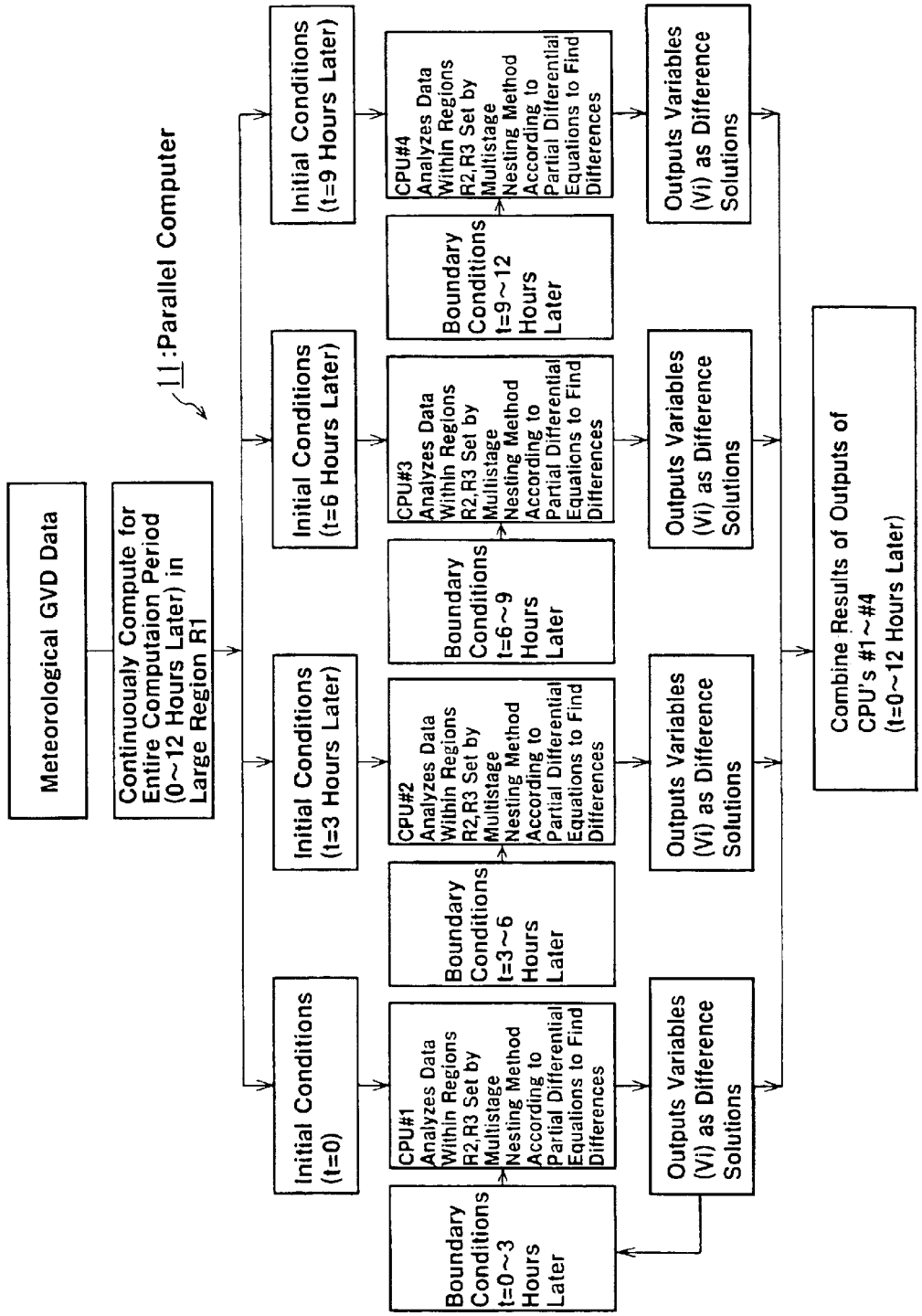
FIG. 5 is a system block diagram showing a parallel computer for realizing a fourth embodiment of the present invention.
Figure 6:
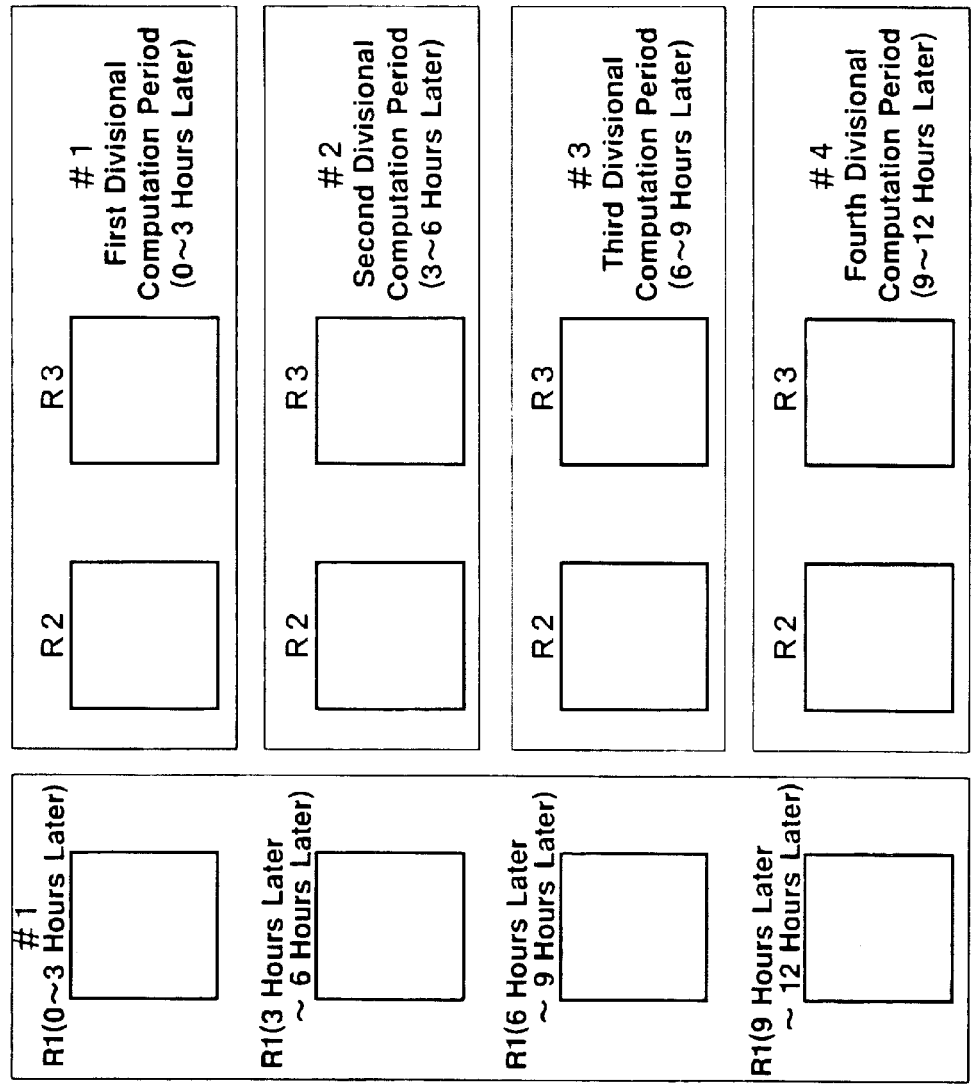
FIG. 6 is an explanation drawing showing a method of computation in the fourth embodiment of the pr sent invention.

According to the fourth embodiment, as shown in FIGS. 5 and 6, when computations are to be performed for the large region R1, computations for the entire computation period (from 0 to 12 hours later) are continuously perform d by the first CPU #1. When computations are to be performed for the medium region R2 and the small region R3, the computation period is divided. For the medium region R2, computations in the first divisional period (from 0 to 3 hours later) are performed by the first CPU #1, computations in the second divisional period (from 3 to 6 hours later) are performed by the second CPU #2, computations in the third divisional period (from 6 to 9 hours later) are performed by the third CPU #3, and computations in the fourth divisional period (from 9 to 12 hours later) are performed by the fourth CPU #4. Subsequently, for the small region R3, computations in the first divisional period (from 0 to 3 hours later) are performed by the first CPU #1, computations in the second divisional period (from 3 to 6 hours later) are performed by the second CPU #2, computations in the third divisional period (from 6 to 9 hours later) are performed by the third CPU #3, and computations in the fourth divisional period (from 9 to 12 hours later) are performed by the fourth CPU #4.

The method of computation per se is the same as that in the second embodiment, and thus its description is omitted herein.

According to the fourth embodiment, as described above, computations in the entire computation period (from 0 to 12 hours later) for the large region R1 are continuously performed by the first CPU #1 alone. Based on the results of the computations for the large region R1 as the initial values, computations for the medium region R2 and the small region R3 are carried out with the use of time division and multistage nesting. In this manner, computations in the entire computation period (from 0 to 12 hours later) for the large region R1 are continuously performed by the first CPU #1 alone, and the results of the computations for the large region R1 are adopted as the initial values. Thus, although computations are performed for the medium region R1 and the small region R2 in the divisional computation periods, the data at the points in time provided by division are consecutive, and meteorological data can be computed accurately.

<Fifth Embodiment>

The fifth embodiment is a development from the fourth embodiment, in which the regions R1, R2 and R3 set by the multistage nesting method are further divided, and calculations for the divided regions are made simultaneously and parallelly using a plurality of CPU's.

Figure 7:
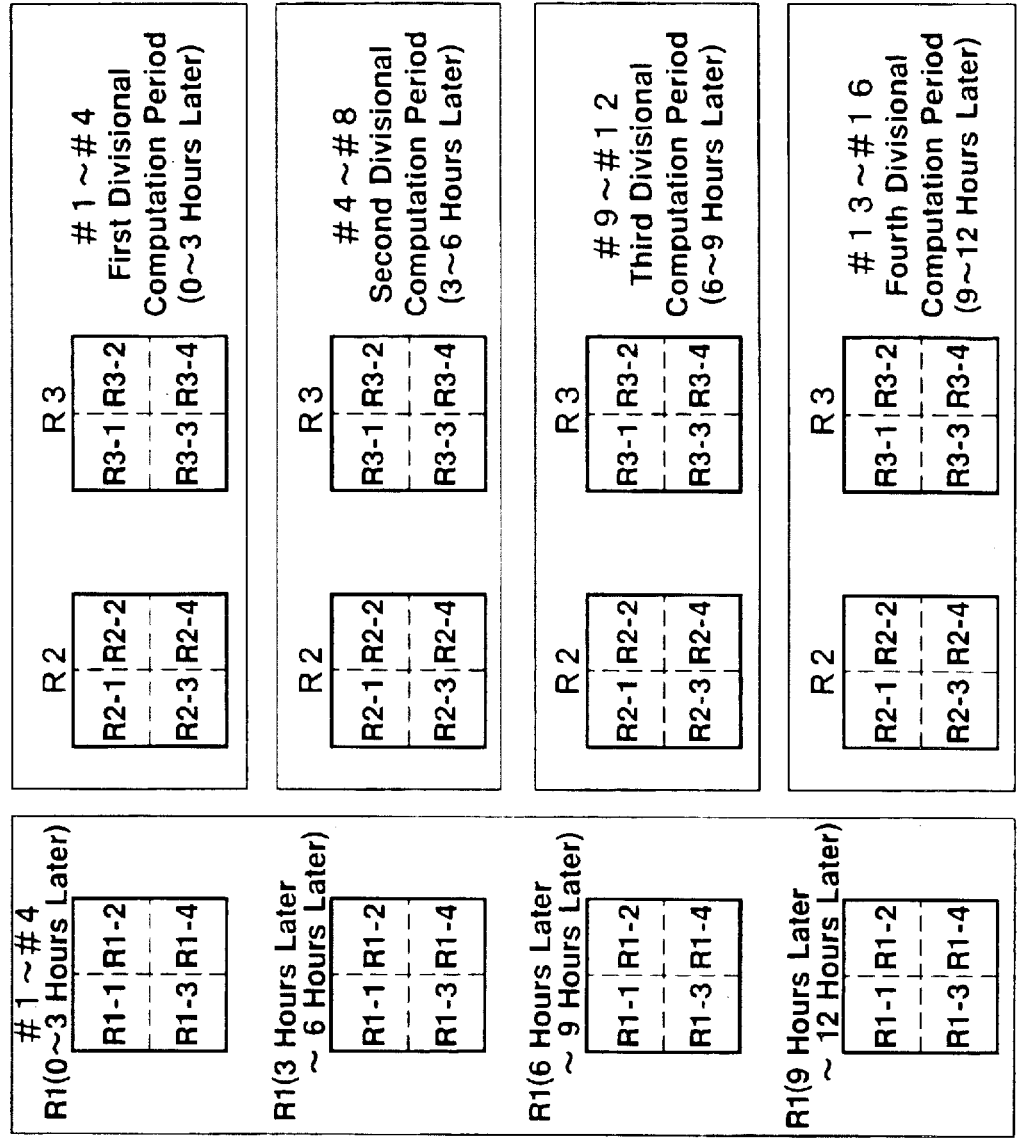
FIG. 7 is an explanation drawing showing a method of computation in a fifth embodiment of the present invention.
Figure 8:
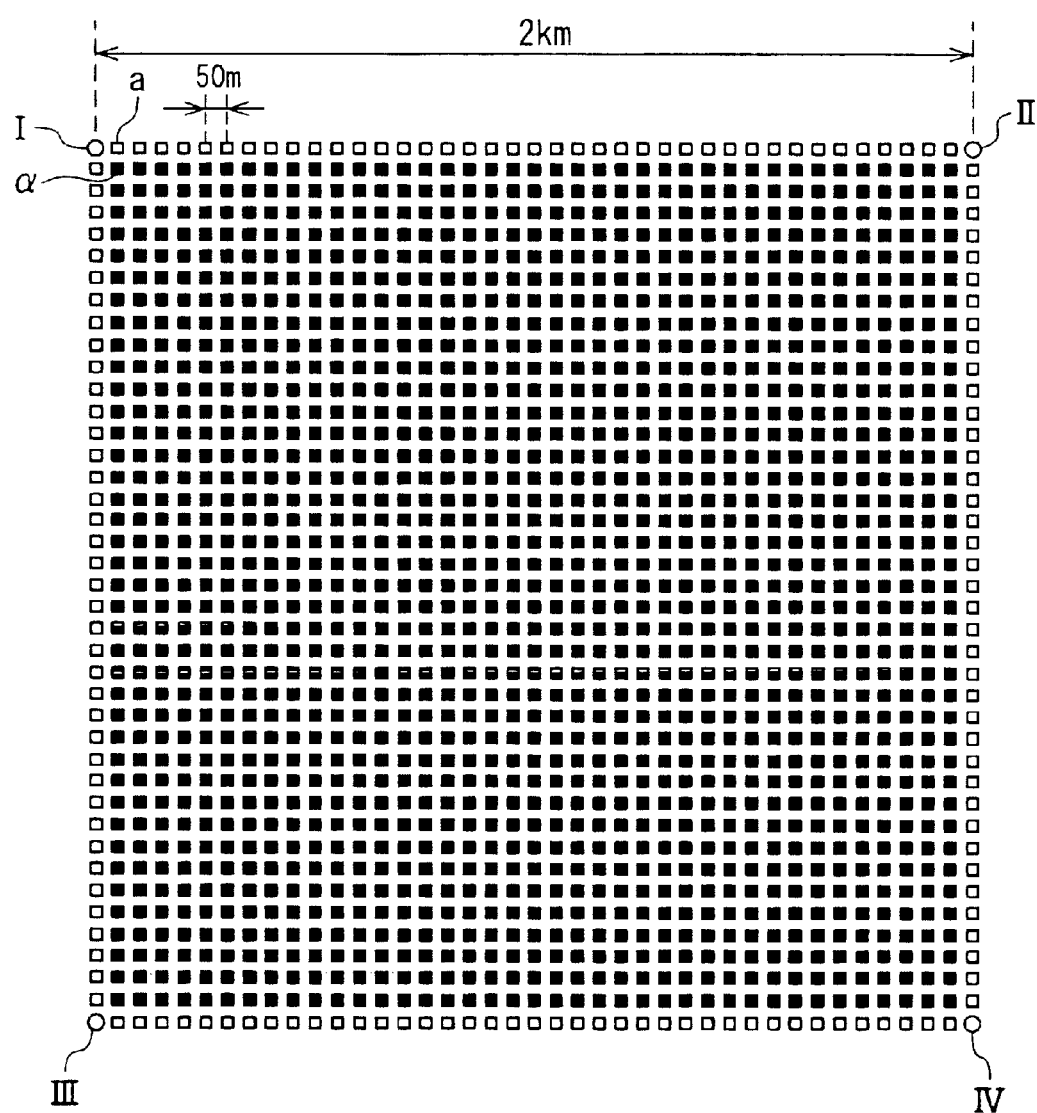
FIG. 8 is an explanation drawing showing the state of arrangement of parent grid point positions and child grid point positions in a small area.
Figure 9:
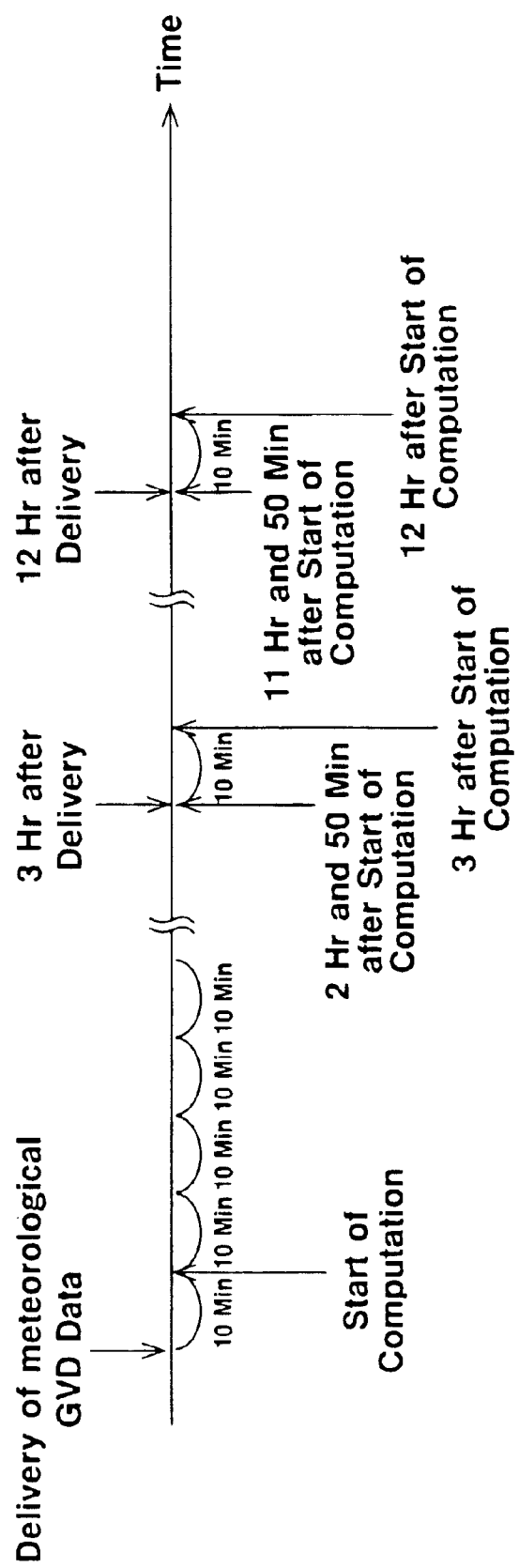
FIG. 9 is an explanation drawing showing the time relationship between online delivery and computation of meteorological data.
Figure 10:
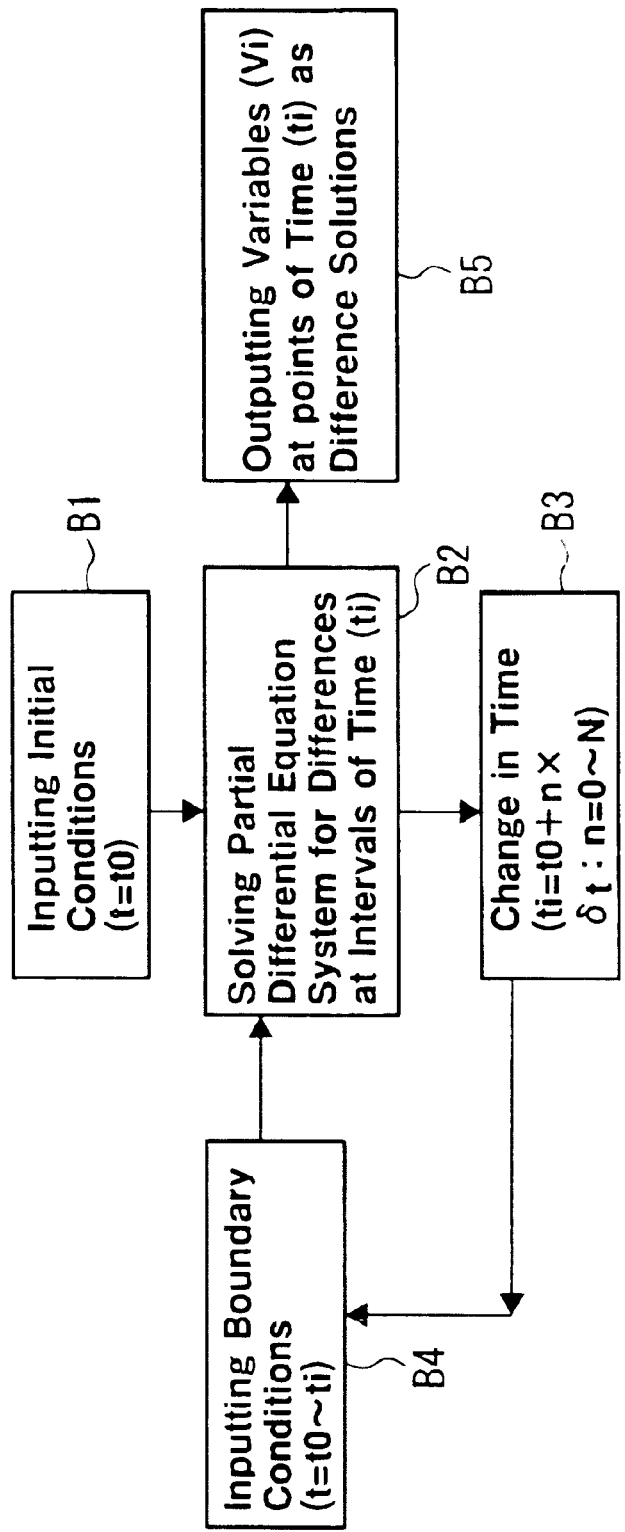
FIG. 10 is a system block diagram showing a computer for realizing a conventional method of computation.
Figure 12:
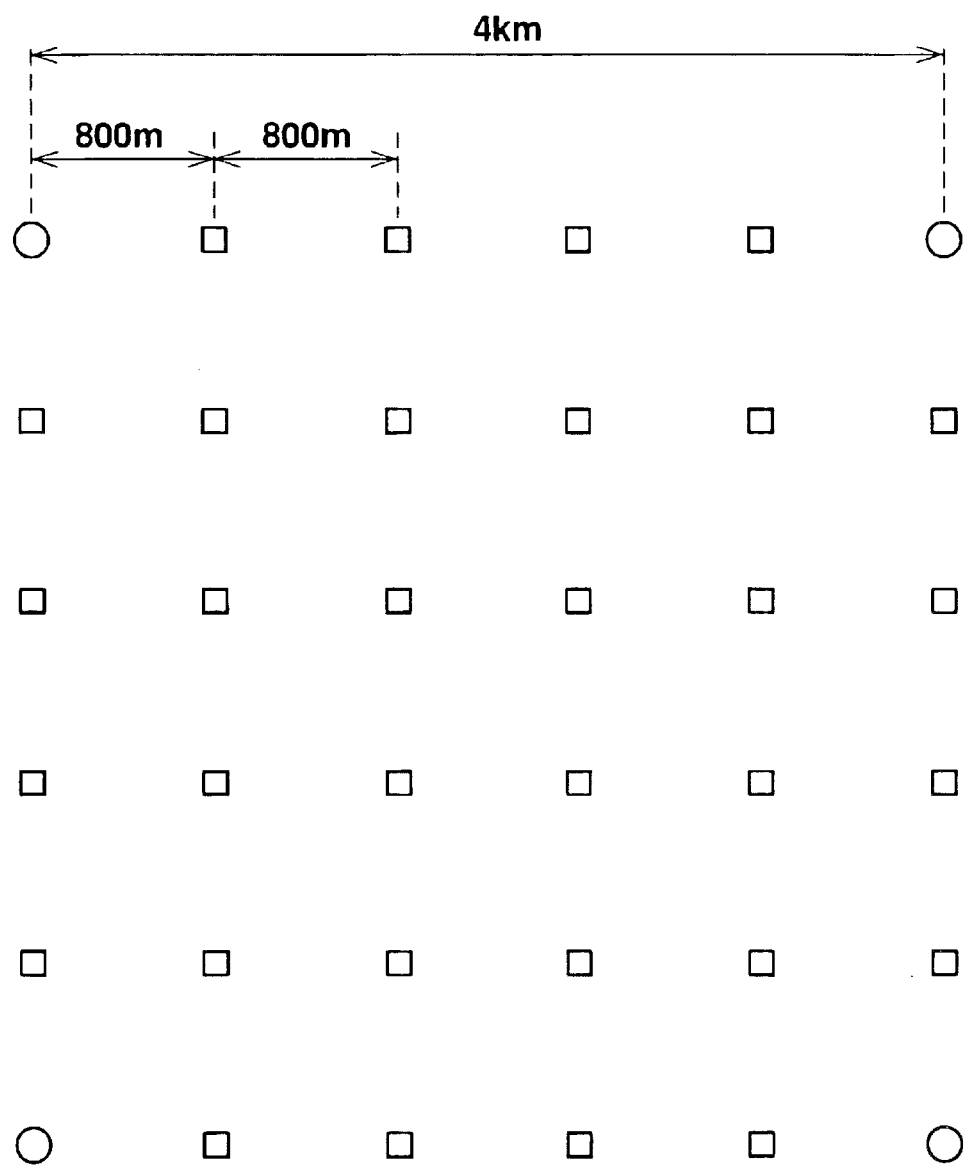
FIG. 12 is an explanation drawing showing the state of arrangement of parent grid point positions and child grid point positions in the large area.
Figure 13:
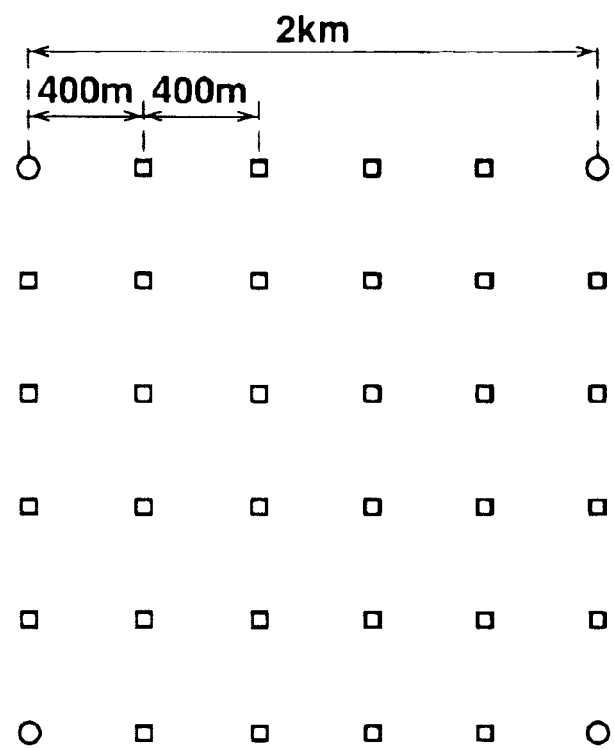
FIG. 13 is an explanation drawing showing the state of arrangement of parent grid point positions and child grid point positions in the medium area.
Figure 14:
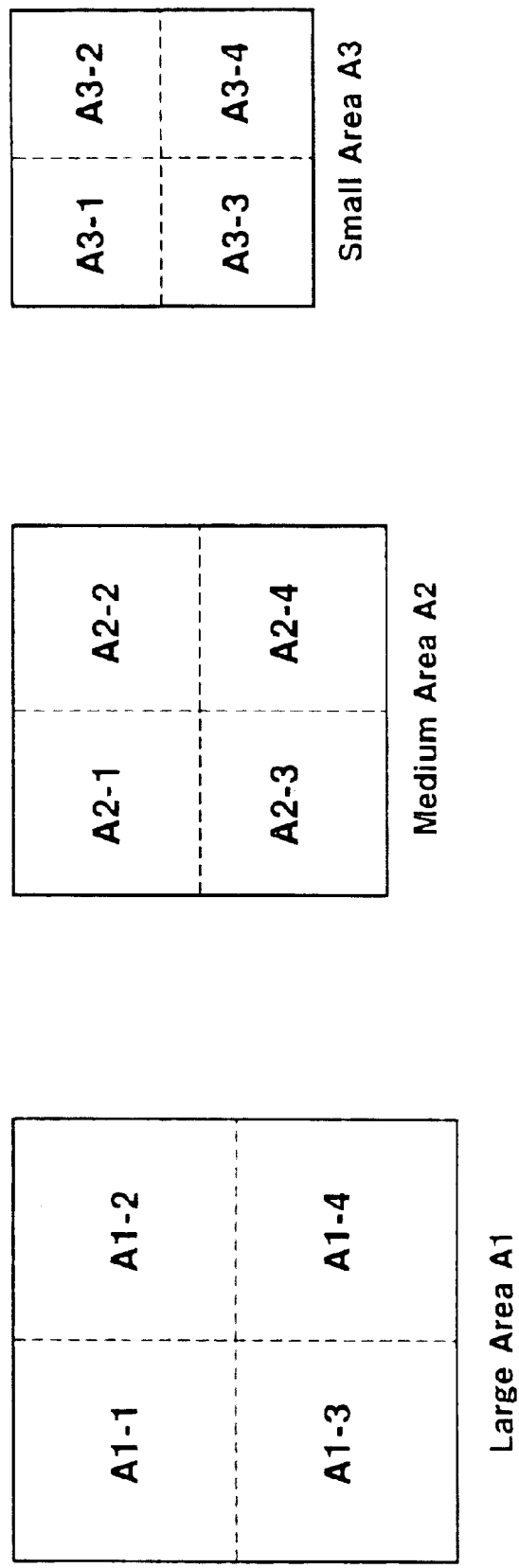
FIG. 14 is an explanation drawing showing a method of computation for divided areas in the multistage nesting method.

As shown in FIG. 7, the seventh embodiment adopts sixteen CPU's, CPU#1~CPU#16. The large region R1 set by the multistage nesting method is divided into four parts, regions R1-1, R1-2, R1-3 and R1-4, the medium region R2 is divided into four parts, regions R2-1, R2-2, R2-3 and R2-4, and the small region R3 is divided into four parts, regions R3-1, R3-2, R3-3 and R3-4.

CPU#1~CPU#4 of the first group are in charge of computations for the entire computation period (from 0 to 12 hours later) in the region R1 and the first divisional period (from the start of computation until 3 hours later) in the regions R2 and R3, CPU#5~CPU#8 of the second group are in charge of computations for the second divisional period (the period from the point in time, 3 hours after the start of computation, until the point in time, 6 hours after the start of computation) in the regions R2 and R3, CPU#9~CPU#12 of the third group are in charge of computations for the third divisional period (the period from the point in time, 6 hours after the start of computation, until the point in time, 9 hours after the start of computation) in the regions R2 and R3, and CPU#13~CPU#16 of the fourth group are in charge of computations for the fourth divisional period (the period from the point in time, 9 hours after the start of computation, until the point in time, 12 hours after the start of computation) in the regions R2 and R3.

Needless to say, after the computations for the region R1 are completed, the computations for the first to fourth divisional periods in the regions R2 and R3 are performed simultaneously and parallelly by the CPU's of the first to fourth groups.

Furthermore, when CPU#1~CPU#4 of the first group carry out computations for the large region R1 in the entire computation period (from 0 to 12 hours later), CPU#1 performs computations for the region R1-1, CPU#2 performs computations for the region R1-2, CPU#3 performs computations for the region R1-3, and CPU#4 performs computations for the region R1-4. In this manner, CPU#1~CPU#4 carry out computations simultaneously and parallelly. Thus, the computing time is shortened to ¼ as compared with computations being performed with single CPU.

When CPU#1~CPU#4 of the first group carry out computations for the medium region R2 in the first divisional computation period, CPU#1 performs computations for the region R2-1, CPU#2 performs computations for the region R2-2, CPU#3 performs computations for the region R2-3, and CPU#4 performs computations for the region R2-4. In this manner, CPU#1~CPU#4 carry out computations simultaneously and parallelly. Thus, the computing time is shortened to ¼ as compared with computations being performed with single CPU.

When CPU#1~CPU#4 of the first group carry out computations for the small region R3 in the first divisional computation period, CPU#1 performs computations for the region R3-1, CPU#2 performs computations for the region R3-2, CPU#3 performs computations for the region R3-3, and CPU #4 performs computations for the region R3-4. In this manner, CPU#1~CPU#4 carry out computations simultaneously and parallelly. Thus, the computing time is shortened to ¼ as compared with computations being performed with single CPU.

Similarly, the CPU's of the second to fourth groups also carry out computations for the medium region R2 and the small region R3 in the second to fourth divisional periods. In this case, the four CPU's perform computations simultaneously and parallelly for the divisional regions spatially divided from these regions, thereby shortening the computing time to ¼.

INDUSTRIAL APPLICABILITY

As described above, the gas status forecast method according to the present invention is designed to be capable of determining a gas status (wind direction, wind speed, etc.), which is detailed in terms of space and time, accurately in a short time based on meteorological observation data rough in terms of space and time. The diffusion status (diffusion range, diffusion concentration) of a diffused substance released from a diffusion source can be forecast by computation with the use of the gas status (wind speed site data) determined by the present invention.

What is claimed is:

1. A gas status forecast method for obtaining,
from meteorological observation data at intervals of a prescribed time at parent grid point positions,
meteorological data at intervals of a constant time, which are shorter than the intervals of the prescribed time, at child grid point positions,
said parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance,
said child grid point positions being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-wet direction on the earth's surface and which are spaced from each other in the north-south direction on the earth's surface by a constant distance shorter than the prescribed distance,
said gas status forecast method involving solving partial differential equations for analysis of atmospheric phenomena by computations using a parallel computer equipped with a plurality of processing units, and comprising determining initial conditions and boundary conditions from the meteorological observation data at the parent grid point positions within a specific region preset in the earth's surface, incorporating the determined initial conditions and boundary conditions into the partial differential equations, and performing computations according to the partial differential equations to obtain the meteorological data at the child grid point positions within the specific region,
said gas status forecast method being characterized by dividing a computation period from start of computation until a predetermined time later into a plurality of divisional computation periods, allocating computations for the respective divisional computation periods to the plurality of processing units, and proceeding with the computations simultaneously and parallelly.

2. A gas status forecast method for obtaining,
from meteorological observation data at intervals of a prescribed time at parent grid point positions,
meteorological data at intervals of a constant time, which are shorter than the intervals of the prescribed time, at child grid point positions,
said parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance,
said child grid point positions being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-wet direction on the earth's surface and which are spaced from each other in the north-south direction on the earth's surface by a constant distance shorter than the prescribed distance,
said gas status forecast method involving solving partial differential equations for analysis of atmospheric phenomena by computations using a parallel computer equipped with a plurality of processing units, and comprising:
presetting in the earth's surface a specific region and a plurality of enlarged regions including the specific region inside and having areas progressively increased over the area of the specific region;

determining initial conditions and boundary conditions in the enlarged regions and the specific region from the meteorological observation data at the parent grid point positions within the enlarged regions and the specific region; and incorporating the determined initial conditions and boundary conditions into the partial differential equations, and performing computations according to the partial differential equations to obtain the meteorological data at the child grid point positions, in such a manner as to perform the computations in the enlarged region with the largest area to the enlarged region with the smallest area sequentially, and then perform the computations in the specific region, said gas status forecast method being characterized by dividing a computation period from start of computation until a predetermined time later into a plurality of divisional computation periods, allocating computations for the respective divisional computation periods to the plurality of processing units, and proceeding with the computations simultaneously and parallelly.

3. The gas status forecast method of claim 2, characterized in that when the computations for the respective divisional computation periods are allocated to the plurality of processing units and performed simultaneously and parallelly, the enlarged regions and th specific region are further divided into a plurality of divisional regions, and the computations for the divisional regions are allocated to the plurality of processing units and performed simultaneously and parallelly.

4. A gas status forecast method for obtaining, from meteorological observation data at intervals of a prescribed time at parent grid point positions, meteorological data at intervals of a constant time, which are shorter than the intervals of the prescribed time, at child grid point positions, said parent grid point positions being positions where a plurality of virtual lines, which extend along a north-south direction on the earth's surface and which are spaced from each other in an east-west direction on the earth's surface by a prescribed distance, cross a plurality of virtual lines, which extend along the east-wet direction on the earth's surface and which are spaced from each other in the north-south direction on the earth's surface by a prescribed distance, said child grid point positions-being positions where a plurality of virtual lines, which extend along the north-south direction on the earth's surface and which are spaced from each other in the east-west direction on the earth's surface by a constant distance shorter than the prescribed distance, cross a plurality of virtual lines, which extend along the east-wet direction on the earth's surface and which are spaced from each other in the north-south direction on the earth's surface by a constant distance shorter than the prescribed distance, said gas status forecast method involving solving partial differential equations for analysis of atmospheric phenomena by computations using a parallel computer equipped with a plurality of processing units, and comprising:

presetting in the earth's surface a specific region and a plurality of enlarged regions including the specific region inside and having areas progressively increased over the area of the specific region;

determining initial conditions and boundary conditions in the enlarged regions and the specific region from the meteorological observation data at the parent grid point positions within the enlarged regions and the specific region; and incorporating the determined initial conditions and boundary conditions into the partial differential equations, and performing computations according to the partial differential equations to obtain the meteorological data at the child grid point positions, in such a manner as to perform the computations in the enlarged region with the largest area to the enlarged region with the smallest area sequentially, and then perform the computations in the specific region, said gas status forecast method being characterized by:

proceeding with the computations for the enlarged region with the largest area throughout a computation period from start of computation until a predetermined time later; and proceeding with the computations for the enlarged region with an area smaller than the largest area and the specific region in such a manner as to divide the computation period from the start of computation until the predetermined time later into a plurality of divisional computation periods, allocate the computations for the respective divisional computation periods to the plurality of processing units, and perform the computations simultaneously and parallelly.

5. The gas status forecast method of claim 4, characterized in that when proceeding with the computations for the enlarged region with the largest area throughout the computation period from the start of computation until the predetermined time later, the enlarged region is further divided into a plurality of divisional regions, and the computations for the divisional regions are allocated to the plurality of processing units and performed simultaneously and parallelly, and when proceeding with the computations for the enlarged region with the area smaller than the largest area and the specific region in such a manner as to allocate the computations for the respective divisional computation periods to the plurality of processing units, and perform the computations simultaneously and parallelly, the enlarged region with the area smaller than the largest area and the specific region are further divided into a plurality of divisional regions, and the computations for the divisional regions are allocated to the plurality of processing units and performed simultaneously and parallelly.

* * * * *